US012592521B2

(12) United States Patent
Chien

(10) Patent No.: US 12,592,521 B2
(45) Date of Patent: Mar. 31, 2026

(54) CONNECTOR ASSEMBLY

(71) Applicant: Molex, LLC, Lisle, IL (US)

(72) Inventor: Tsai-Hui Chien, New Taipei (TW)

(73) Assignee: Molex, LLC, Lisle, IL (US)

( * ) Notice: Subject to any disclaimer, the term of this patent is extended or adjusted under 35 U.S.C. 154(b) by 383 days.

(21) Appl. No.: 18/196,457

(22) Filed: May 12, 2023

(65) Prior Publication Data

US 2023/0378698 A1 Nov. 23, 2023

(30) Foreign Application Priority Data

May 17, 2022 (CN) .......................... 202210537654.2

(51) Int. Cl.
H01R 13/6581 (2011.01)
F21V 8/00 (2006.01)

(52) U.S. Cl.
CPC ....... H01R 13/6581 (2013.01); G02B 6/0008 (2013.01)

(58) Field of Classification Search
CPC .......................... H01R 13/6581; G02B 6/0008
USPC ....................................................... 439/607.2
See application file for complete search history.

(56) References Cited

U.S. PATENT DOCUMENTS

| | | | | | |
|---|---|---|---|---|---|
| 5,876,239 | A | * | 3/1999 | Morin | .................. H01R 13/717 439/490 |
| 5,938,324 | A | * | 8/1999 | Salmon | .................. G09F 9/305 362/555 |

| | | | | | |
|---|---|---|---|---|---|
| 7,390,212 | B1 | * | 6/2008 | Yang | .................... H01R 13/717 439/607.05 |
| 10,811,795 | B2 | * | 10/2020 | Roldan | .............. H01R 13/6271 |
| 10,826,251 | B2 | * | 11/2020 | Liu | .................... H01R 13/7172 |
| 2006/0099838 | A1 | * | 5/2006 | Meyers | .................. E02F 9/006 439/134 |
| 2007/0086206 | A1 | * | 4/2007 | Weng | .................. G02B 6/4206 362/555 |

(Continued)

FOREIGN PATENT DOCUMENTS

| | | | | |
|---|---|---|---|---|
| AU | 2008100292 | A4 | * | 5/2008 |
| CN | 101201426 | A | * | 6/2008 |

(Continued)

*Primary Examiner* — Peter G Leigh

(57) ABSTRACT

A connector assembly includes a shielding cage, a light guiding pipe and a base. The shielding cage has a plurality of walls and an accommodating space defined by the plurality of walls. The light guiding pipe is assembled to the shielding cage, the light guiding pipe has a light outputting end, a light inputting end and a first assembling portion at a location of the light guiding pipe adjacent to the light inputting end. The base has a light guiding pipe accommodating hole and a second assembling portion provided to the light guiding pipe accommodating hole. The light guiding pipe is assembled in the light guiding pipe accommodating hole, and the first assembling portion of the light guiding pipe is assembled to the second assembling portion of the light guiding pipe accommodating hole, after the first assembling portion of the light guiding pipe is assembled to the second assembling portion of the light guiding pipe accommodating hole from up to down relative to the base, the light guiding pipe is rotated along a rotating direction so that the first assembling portion is fixed to the second assembling portion at the light guiding pipe accommodating hole.

20 Claims, 15 Drawing Sheets

(56)                     References Cited

U.S. PATENT DOCUMENTS

| | | | |
|---|---|---|---|
| 2015/0153019 A1* | 6/2015 | Yoshizumi ........... | G02B 6/0008 |
| | | | 362/555 |
| 2017/0261674 A1* | 9/2017 | Henry ................. | G02B 6/0006 |
| 2020/0049912 A1* | 2/2020 | Lu ........................ | G02B 6/4269 |
| 2021/0096301 A1* | 4/2021 | Chen ................. | H01R 13/6594 |
| 2021/0132313 A1* | 5/2021 | Lu ........................ | G02B 6/4277 |

FOREIGN PATENT DOCUMENTS

| | | | | |
|---|---|---|---|---|
| CN | 203797569 U | * | 8/2014 | |
| CN | 206421056 U | * | 8/2017 | |
| CN | 110799026 A | * | 2/2020 | ......... H05K 7/20409 |
| TW | M484897 U | | 8/2014 | |
| TW | M514183 U | | 12/2015 | |
| TW | 202008664 A | | 2/2020 | |

* cited by examiner

CONNECTOR ASSEMBLY

RELATED APPLICATIONS

This application claims priority to Chinese Patent Application No. 202210537654.2 filed on May 17, 2022, which is incorporated herein by reference in its entirety.

TECHNICAL FIELD

The present disclosure relates to a connector assembly, and particularly relates to a connector assembly which has a light guiding pipe.

BACKGROUND

Chinese utility model patent application issuance publication No. CN203797569U (corresponding Chinese Taiwan utility model patent application issuance publication No. TWM484897) discloses a light guiding device which is used for a light emitting diode, the light guiding device includes a light guiding seat, a bottom portion of the light guiding seat has a base seat, at least two light guiding posts extend out of a top surface of the base seat, and a bottom surface of the base seat is provided with accommodating grooves which respectively correspond to respective light guiding posts in position and at least one light shading cover which has a non-transparent color and a rectangle frame, the rectangle frame can sheathe in the respective accommodating groove, the frame is longitudinally provided with a through hole at a positioned where the respective light guiding post is positioned, the through hole allows to a light emitting diode to be accommodated therein, and the frame is provided with at least one pair of latching hooks at a front side and a rear side of the frame, the at least one pair of latching hooks protrude and can latch to a front edge and a rear edge of the base seat so that the light shading cover is firmly positioned in the respective accommodating groove.

Such a prior art needs to mount separately the light shading cover at a tip of the respective light guiding post, manufacturing and assembling are too complex and manufacturing cost is increased. Moreover, because the light shading cover uses an elastic latching structure, in an assembling process, if the elastic latching hook is subjected to a too large or improper force, the elastic latching hook would be damaged or detached from latching. And, in a case that the light shading cover needs to be disassembled, because the light shading cover uses the elastic latching structure, in a disassembling process, the elastic latching hook also needs to be pulled away, such an operation easily damages the light shading cover or the light guiding post.

Chinese invention patent application publication No. CN112578506A (corresponding United State patent application publication No. US2021/0,096,301A1) discloses a holding member which is used to fix a light guiding pipe, light entering ends of a plurality of light guiding pipes insert into a holding body of the holding member, the holding member further has two latching arms which extend forwardly and upwardly from a position where a front end of the holding body is presented, each latching arm has a latching protrusion which is positioned at a tip of the latching arm and is used to latch with a latching post on the light guiding pipe, so that the light guiding pipe is capable of being held on the holding member.

However, because the holding member uses an elastic latching structure, in an assembling process, if the elastic latching arm is subjected to a too large or improper force, the elastic latching arm would be damaged or detached from latching, in a case that the holding member needs to be disassembled, the elastic latching arm also needs to be pulled away, such an operation easily damages the holding member or the light guiding pipe.

SUMMARY

Therefore, an object of the present disclosure is to provide a connector assembly which can improve at least one problem to be solved in the prior art.

Accordingly, in some embodiments, a connector assembly of the present disclosure comprises a shielding cage, a light guiding pipe and a base. The shielding cage has a plurality of walls and an accommodating space defined by the plurality of walls. The light guiding pipe is assembled to the shielding cage, the light guiding pipe has a light outputting end, a light inputting end and a first assembling portion at a location of the light guiding pipe adjacent to the light inputting end. The base has a light guiding pipe accommodating hole and a second assembling portion provided to the light guiding pipe accommodating hole. The light guiding pipe is assembled in the light guiding pipe accommodating hole, and the first assembling portion of the light guiding pipe is assembled to the second assembling portion of the light guiding pipe accommodating hole, after the first assembling portion of the light guiding pipe is assembled to the second assembling portion of the light guiding pipe accommodating hole from up to down relative to the base, the light guiding pipe is rotated along a rotating direction so that the first assembling portion is fixed to the second assembling portion at the light guiding pipe accommodating hole.

In some embodiments, the first assembling portion comprises a locking block which protrudes from a side surface of the light guiding pipe; the second assembling portion comprises a locking block insertion groove and a locking block locking groove, the locking block insertion groove extends downwardly from a top end of the light guiding pipe accommodating hole along an inner wall surface of the light guiding pipe accommodating hole, the locking block locking groove is communicated with the locking block insertion groove and extends circumferentially along the inner wall surface of the light guiding pipe accommodating hole along the rotating direction; after the locking block of the light guiding pipe inserts into the locking block insertion groove at the light guiding pipe accommodating hole from up to down, the light guiding pipe is capable of being fixed by rotating the light guiding pipe to make the locking block rotate and enter into the locking block locking groove.

In some embodiments, the locking block insertion groove has a lower end surface which is used to limit a position of the locking block in a downward direction, the locking block locking groove has an inner stopping surface which is used to limit a position of the locking block after the locking block is rotated.

In some embodiments, the first assembling portion further comprises a position-limiting block which protrudes from the side surface of the light guiding pipe; the second assembling portion further comprises a position-limiting block lower stopping surface which is used to limit a position of the position-limiting block in a downward direction; the locking block locking groove has a locking block upper stopping surface which is used to limit a position of the locking block in an upward direction.

In some embodiments, the second assembling portion further comprises a position-limiting block accommodating recessed groove, the position-limiting block accommodating recessed groove comprises the position-limiting block lower stopping surface which is constructed by a bottom surface of the position-limiting block accommodating recessed groove and two position-limiting surfaces which are constructed by two inner end surfaces of the position-limiting block accommodating recessed groove and are respectively used to limit a position of the position-limiting block before the position-limiting block is rotated and a position of the position-limiting block after the position-limiting block is rotated.

In some embodiments, the locking block and the position-limiting block are respectively positioned to two opposite sides of the light guiding pipe, and a position of the position-limiting block is higher than a position of the locking block.

In some embodiments, the light guiding pipe accommodating hole has a guiding inner edge which is positioned a top end of the light guiding pipe accommodating hole and gradually expands upwardly.

In some embodiments, the base further has a light emitting member accommodating space which is communicated with a bottom portion of the light guiding pipe accommodating hole.

In some embodiments, the plurality of walls of the shielding cage comprises a top wall and a rear wall, the light guiding pipe has a first segment which extends along a front-rear direction and is assembled to above the top wall of the shielding cage and a second segment which extends downwardly from a rear end of the first segment and is assembled to the base; the light guiding pipe has the first segment which is adjacent to the top wall of the shielding cage and the second segment which is adjacent to the rear wall of the shielding cage, the base is fixed on the rear wall of the shielding cage.

In some embodiments, when the locking block of the light guiding pipe inserts into to a locking block insertion groove at the light guiding pipe accommodating hole, the light guiding pipe is inclined laterally relative to the front-rear direction by an angle, after rotating the light guiding pipe makes the locking block rotate and enter into the locking block locking groove, the light guiding pipe is rotated to be parallel to the front-rear direction.

In some embodiments, the shielding cage has a holding piece which is adjacent to the rear wall, the base has a holding hole which allows the holding piece to correspondingly insert therein.

In some embodiments, the shielding cage has a positioning piece which is adjacent to the top wall, the first segment of the light guiding pipe has a positioning block which correspondingly cooperates with the positioning piece.

In some embodiments, the positioning piece has a positioning recessed groove, the positioning block of the light guiding pipe has a positioning neck which correspondingly cooperates with the positioning recessed groove.

In the connector assembly of the present disclosure, a rotary type assembling structure between the light guiding pipe and the base is employed, not only the light guiding pipe and the base have a reliable engagement force after the light guiding pipe and the base are assembled, but also the light guiding pipe and the base are not easily subjected to be damaged after the light guiding pipe and the base are repeatedly disassembled and assembled.

BRIEF DESCRIPTION OF THE DRAWINGS

Other features and effects of the present disclosure will be apparent from an embodiment referring to the drawings, in which.

DETAILED DESCRIPTION OF THE PREFERRED EMBODIMENTS

Figure 1:
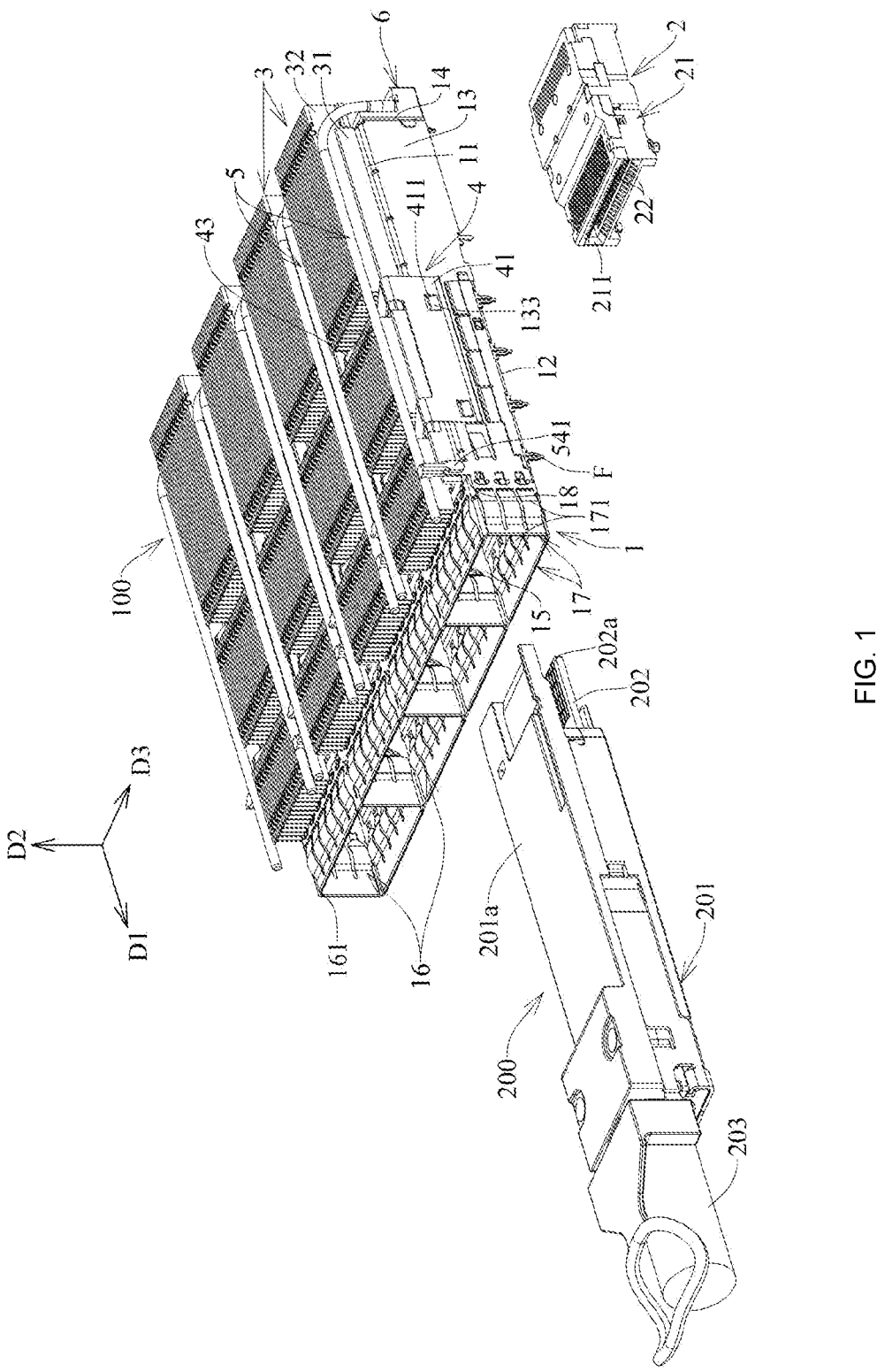
FIG. 1 is a perspective exploded view of an embodiment of a connector assembly of the present disclosure and a pluggable module.

Before the present disclosure is described in detail, it is noted that like elements are represented by the same reference numerals in the following description.

Figure 2:
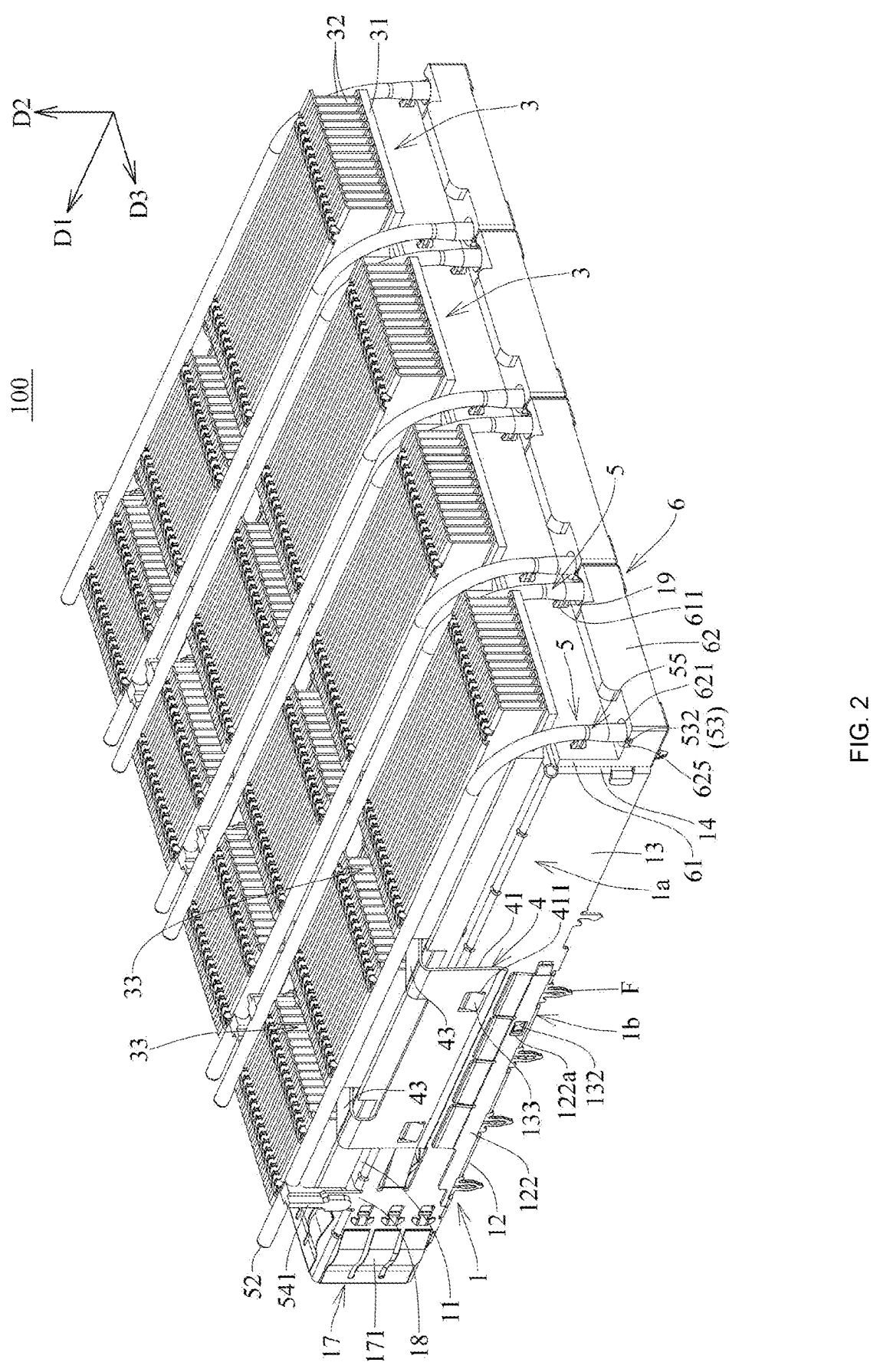
FIG. 2 is a perspective view of the embodiment of the connector assembly of the present disclosure.
Figure 3:
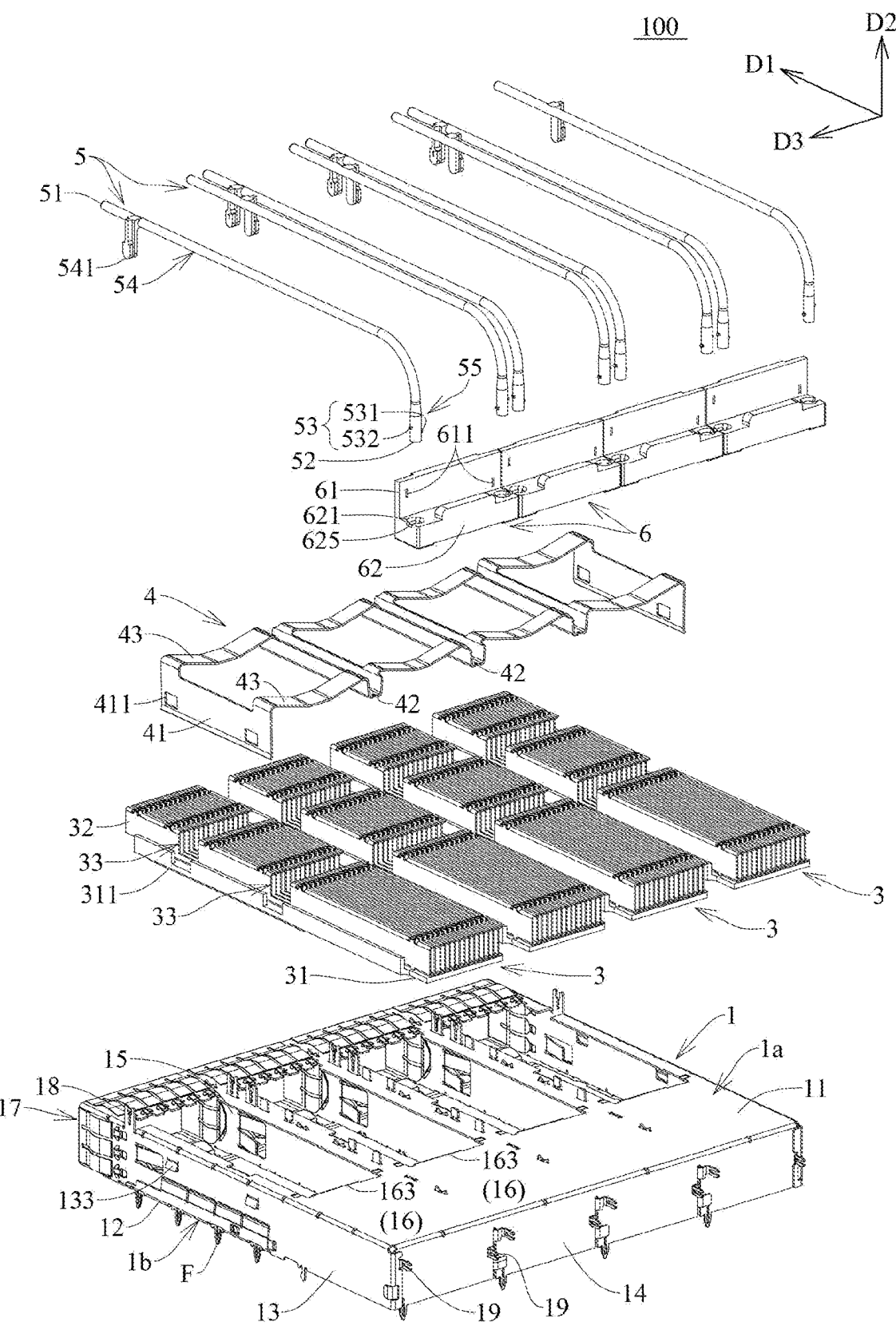
FIG. 3 is a perspective exploded view of the embodiment according to FIG. 2.
Figure 4:
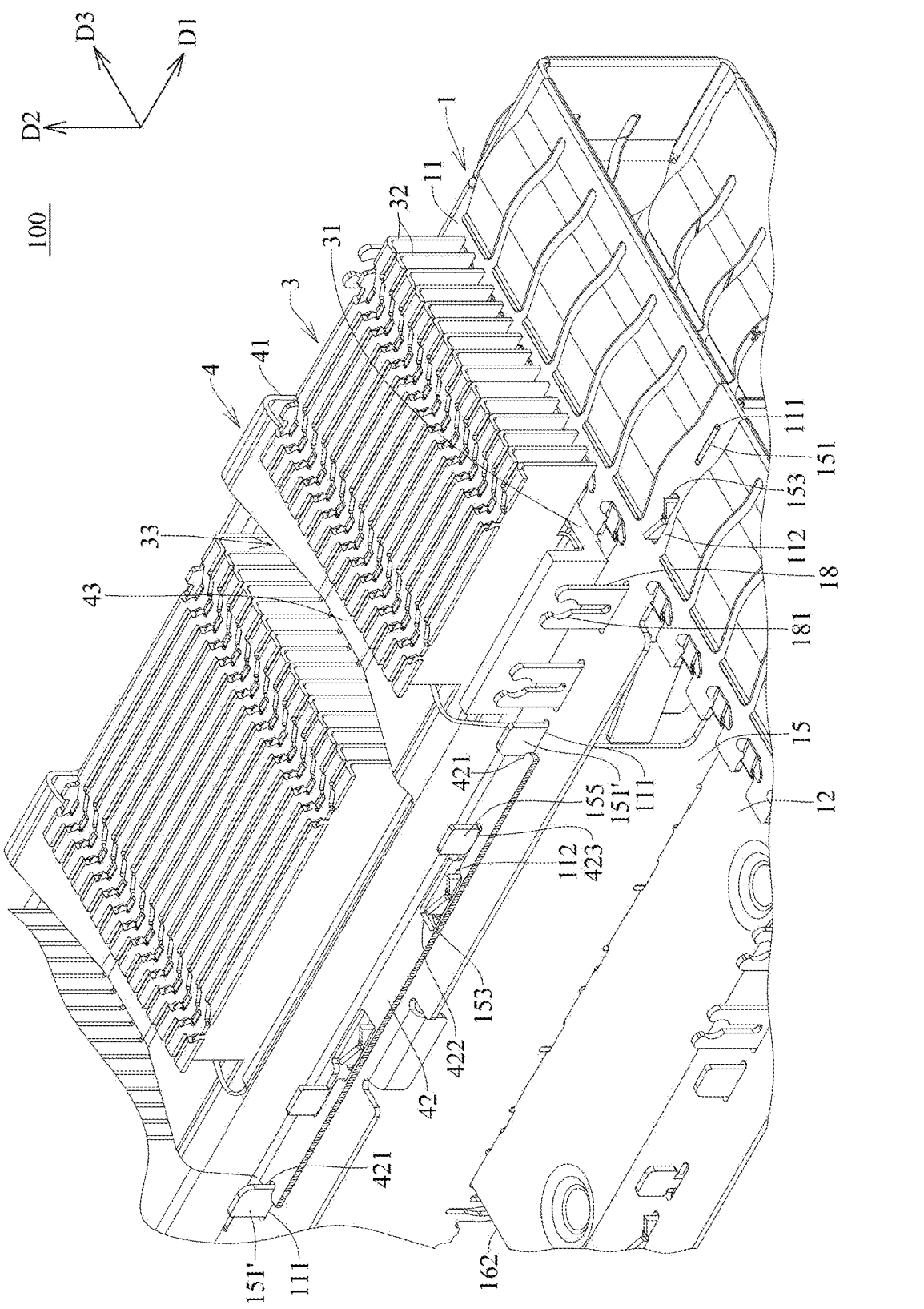
FIG. 4 is a partial perspective view of the embodiment, in which a part of a clip is cut away.
Figure 5:
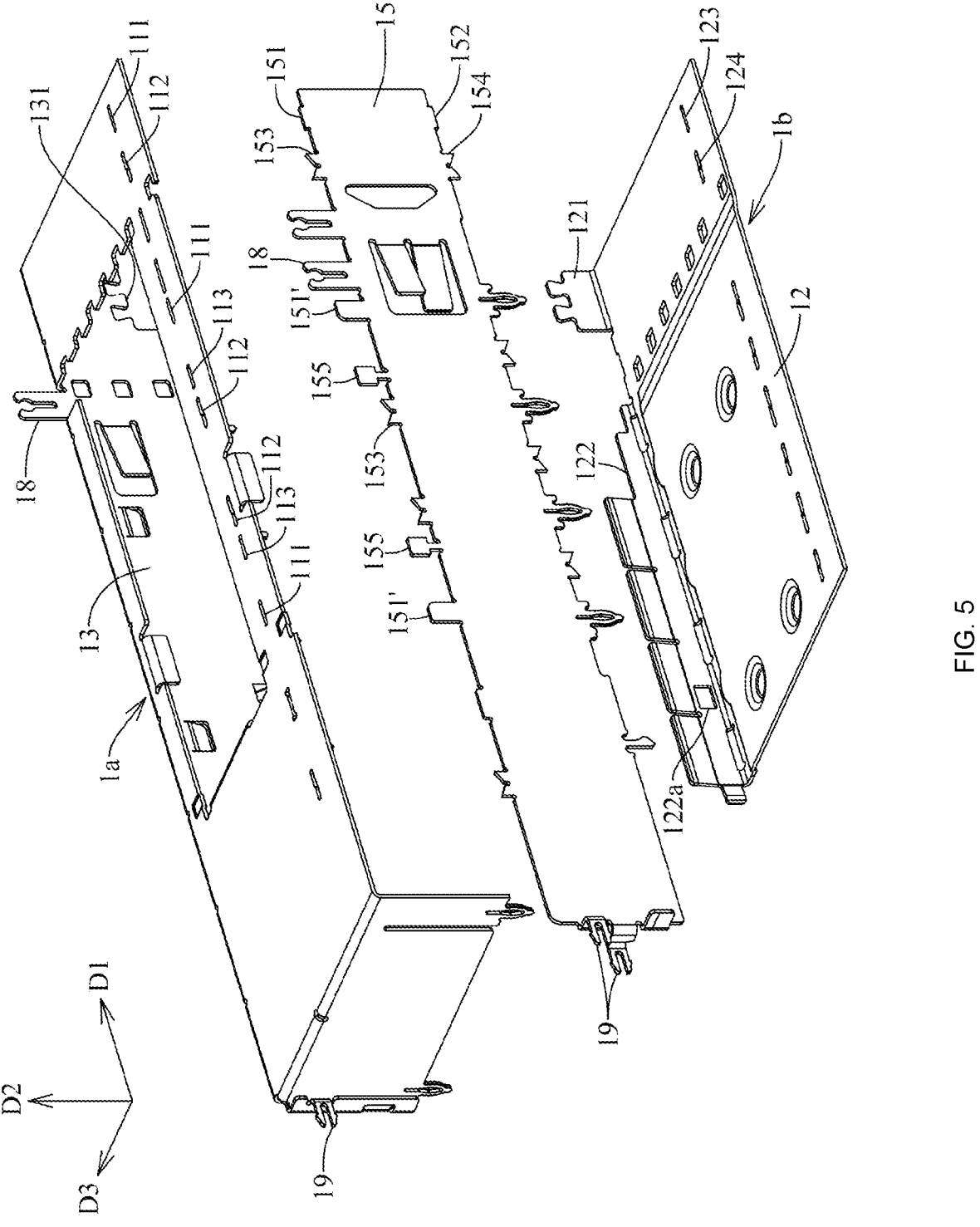
FIG. 5 is a partial perspective exploded view of a shielding cage of the embodiment.
Figure 6:
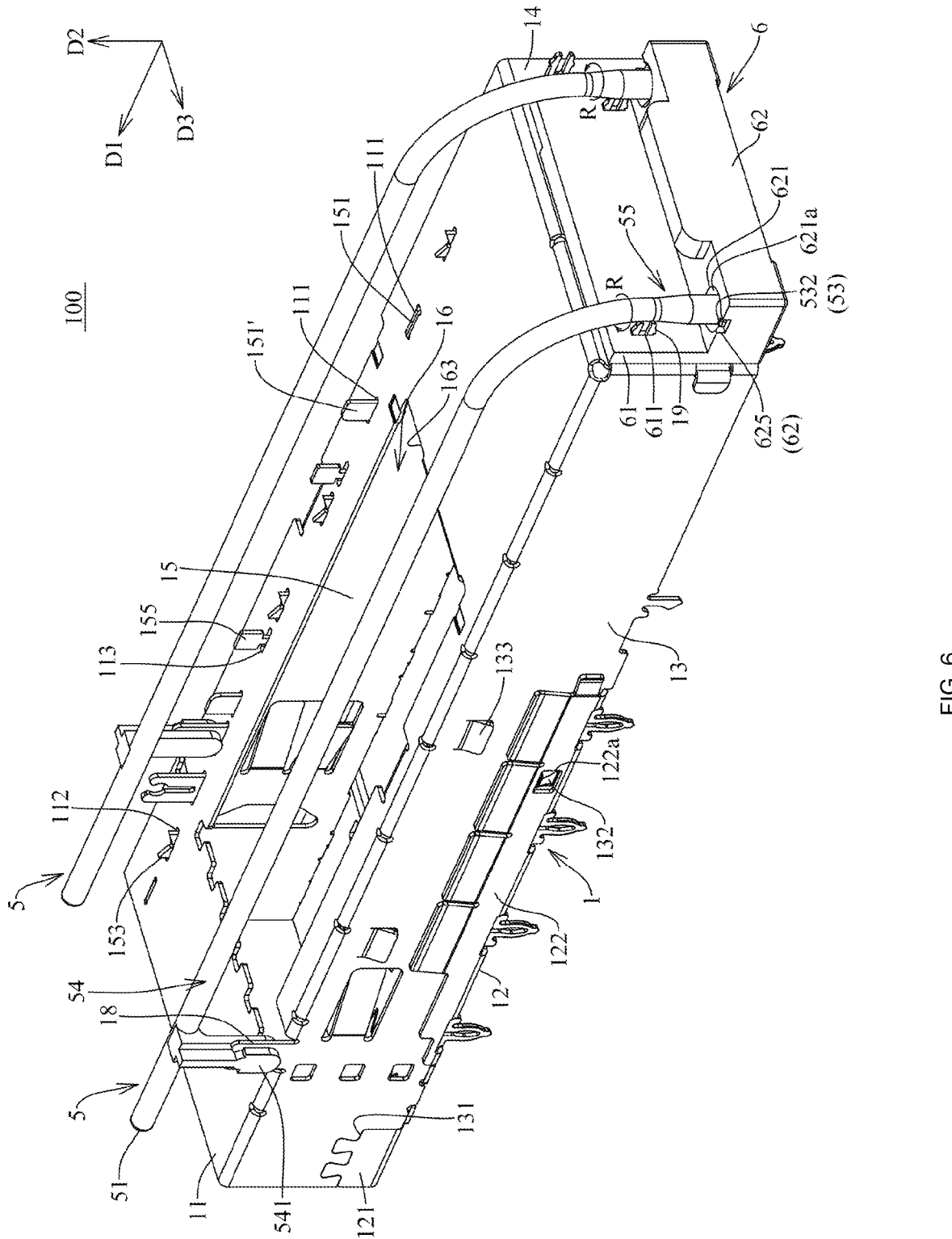
FIG. 6 is a partial perspective view of the shielding cage, light guiding pipes and a base of the embodiment, in which a heat sink is omitted.

Referring to FIG. 1 to FIG. 3, an embodiment of the connector assembly 100 of the present disclosure is adapted to allow a pluggable module 200 to mate therewith. The pluggable module 200 includes a housing body 201, a mating board 202, and a cable 203. The housing body 201 includes an inserting portion 201a, the mating board 202 is provided to a tip of the inserting portion 201a, and the mating board 202 has a plurality of contacting fingers 202b thereon, the cable 203 is provided to the housing body 201 and is mechanically and electrically connected to the mating board 202. The connector assembly 100 includes a shielding cage 1, a plurality of receptacle connectors 2 (only one of the plurality of receptacle connectors 2 is shown in the figures), a plurality of heat sinks 3, a clip 4, a plurality of light guiding pipes 5, and a plurality of bases 6.

Referring to FIG. 1 to FIG. 5, the shielding cage 1, for example, is constituted by a metal plate, the shielding cage 1 extends along a front-rear direction D1, the shielding cage 1 has a top wall 11, a bottom wall 12 which is spaced apart from and faces the top wall 11 along an up-down direction D2, two side walls 13 which are spaced apart from each other and face each other along a left-right direction D3 and are respectively connected to two sides of the top wall 11 and the bottom wall 12, and a rear wall 14 which is connected to a rear edge of the top wall 11 and the rear edges of the two side walls 13. In the present embodiment, the shielding cage 1 further includes a plurality of partitioning plates 15 which extend along the front-rear direction D1 and the up-down direction D2 and are connected between the top wall 11 and the bottom wall 12, the top wall 11, the bottom wall 12, the two side walls 13, the rear wall 14 and the plurality of partitioning plates 15 together define a plurality of accommodating spaces 16 which extend along the front-rear direction D1 and are arranged side by side along the left-right direction D3. Each accommodating space 16 has a front end opening 161 which is toward the front and allows the pluggable module 200 to insert therein, a bottom opening 162 which is positioned behind the bottom wall 12, and a top opening 163 which is formed to a front segment of the top wall 11.

Specifically, in the present embodiment, the shielding cage 1 includes an upper shell 1*a* and a lower shell 1*b* which are assembled with each other. The upper shell 1*a* has the top wall 11, the two side walls 13 and the rear wall 14 which are integrally connected with each other, the lower shell 1*b* has the bottom wall 12, and the lower shell 1*b* is provided to the two side walls 13 of the upper shell 1*a* by assembling. Each side wall 13 of the upper shell 1*a* is formed with a dovetail recessed portion 131 at a bottom edge of the side wall 13 close to a front end of the side wall 13, and each side wall 13 is outwardly formed with a plurality of latching blocks 132. The bottom wall 12 of the lower shell 1*b* is integrally upwardly formed with two dovetail protruding portions 121 which correspondingly cooperate with the dovetail recessed portions 131 of the two side walls 13 and two side assembling portions 122 which are correspondingly assembled to outer sides of the two side walls 13. Each side assembling portion 122 is formed with a plurality of latching holes 122*a* which latch with the plurality of latching block 132 of the corresponding side wall 13, so that the bottom wall 12 of the lower shell 1*b* is capable of being assembled to the two side walls 13 of the upper shell 1*a*.

The plurality of partitioning plates 15 are assembled between the top wall 11 of the upper shell 1*a* and the bottom wall 12 of the lower shell 1*b*, the top wall 11 of the upper shell 1*a* has upper positioning holes 111 and upper fixing apertures 112, the bottom wall 12 of the lower shell 1*b* has lower positioning holes 123 and lower fixing apertures 124, each partitioning plate 15 has an upper positioning piece 151, an upper positioning piece 151' and a lower positioning piece 152 which respectively pass along the corresponding upper positioning holes 111 and the corresponding lower positioning hole 123, and an upper fixing bendable piece 153 and a lower fixing bendable piece 154 which respectively pass along the corresponding upper fixing aperture 112 and the corresponding lower fixing aperture 124. The upper positioning piece 151 and the upper positioning piece 151' are different in that, the upper positioning piece 151 does not upwardly pass out of the corresponding upper positioning hole 111, the upper positioning piece 151' upwardly pass out of the corresponding upper positioning hole 111. The upper fixing bendable piece 153 and the lower fixing bendable piece 154 each are constituted by two piece bodies which are arranged along the front-rear direction D1, the two piece bodies are used to bend along the left-right direction D3 respectively after the two piece bodies pass out of the upper fixing aperture 112 or the lower fixing aperture 124 so as to generate fixing function (in the figures, a state that the two piece bodies of the upper fixing bendable piece 153 and the two piece bodies of the lower fixing bendable piece 154 do not bend is shown).

Rear segments of the plurality of accommodating spaces 16 respectively allow the plurality of receptacle connectors 2 to be provided therein, each receptacle connector 2 includes a receptacle housing 21 which is formed with a mating slot 211 toward the front and a plurality of receptacle terminals 22 which are provided to the receptacle housing 21 and enter into the mating slot 211. The plurality of receptacle connectors 2 may be mechanically and electrically provided to a circuit board (not shown), and are respectively provided to the rear segments of the plurality of accommodating spaces 16 via the bottom openings 162 of the plurality of accommodating spaces 16 so as to be covered by the shielding cage 1, but the present disclosure is not limited thereto.

After the inserting portion 201*a* of the pluggable module 200 enters into the corresponding accommodating space 16 of the shielding cage 1 from any one of the front end openings 161, the mating board 202 at the tip of the inserting portion 201*a* of the pluggable module 200 can insert into the mating slot 211 of the receptacle housing 21 of the corresponding receptacle connector 2, so that the plurality of contacting fingers 202*b* of the mating board 202 contact the plurality of receptacle terminals 22 in the mating slot 211 of the receptacle housing 21, and the pluggable module 200 and the corresponding receptacle connector 2 of the connector assembly 100 mate with each other.

In addition, the bottom edges of the two side walls 13, a bottom edge of the rear wall 14 and bottom edges of the plurality of partitioning plates 15 of the shielding cage 1 are further provided with a plurality of grounding legs F which are arranged to be spaced apart from each other, extend downwardly and are adapted to be fixed on the circuit board and/or be connected to grounding traces. A plurality of grounding members 17 are further provided at the plurality of front end openings 161 of the shielding cage 1, each grounding member 17 has a plurality of grounding elastic pieces 171 which extend rearwardly from a position of the front end opening 161 and are distributed to an outer side of the shielding cage 1 and an inner side of the shielding cage 1, the grounding elastic piece 171 of the plurality of grounding elastic pieces 171 which is positioned at the outer side of the shielding cage 1 is used to contact a casing (not shown), the grounding elastic piece 171 of the plurality of grounding elastic pieces 171 which is positioned at the inner side of the shielding cage 1 is used to contact the housing body 201 of the pluggable module 200.

The plurality of heat sinks 3 are respectively provided on the top wall 11 of the shielding cage 1, each heat sink 3 has a heat dissipating base plate 31 which is provided to the top wall 11 and a plurality of heat dissipating fins 32 which are provided to a top surface of the heat dissipating base plate 31, the plurality of heat dissipating fins 32 extend along the front-rear direction D1 and are arranged side by side and latch with each other in the left-right direction D3, a bottom portion of the heat dissipating base plate 31 has a thermal coupling portion 311 which passes through the corresponding top opening 163 and enters into the corresponding accommodating space 16. The clip 4 has two latching portions 41 which respectively latch to the two side walls 13 of the shielding cage 1, a plurality of fixing portions 42 which respectively correspond to the plurality of partitioning plates 15 and are provided to the top wall 11, and a plurality of pressing-against portions 43 which extend and are connected along the left-right direction D3 and downwardly elastically press against the plurality of heat sinks 3. The plurality of pressing-against portions 43 are arranged as two rows which each are along the front-rear direction D1, and some of the plurality of pressing-against portions 43 each are connected between the latching portion 41 and the fixing portion 42, the remaining pressing-against portions 43 of the plurality of pressing-against portions 43 each are connected between the corresponding two fixing portions 42. In the present embodiment, the plurality of pressing-against portions 43 press against the heat dissipating fins 32 of the plurality of heat sinks 3, and each heat sink 3 further has two accommodating recessed grooves 33 which are formed to the plurality of heat dissipating fins 32 of the heat sink 3 and are used to accommodate the corresponding pressing-against portions 43. Specifically, each side wall 13 which is positioned to each of two sides of the shielding cage 1 is formed with a plurality of latching protrusions 133, each latching portion 41 is formed with a plurality of latching holes 411 which correspondingly latch with the plurality of latching protrusions 133 of the corresponding side wall 13. Each fixing portion 42 has positioning notches 421 which are respectively positioned to a front end and a rear end of the fixing portion 42, an avoiding opening 422 which is used to avoid the upper fixing bendable piece 153, and a fixing hole 423 which is adjacent to the avoiding opening 422. The positioning notches 421 correspondingly cooperate with the two upper positioning pieces 151' which are adjacent to the fixing portion 42 and upwardly pass out of the upper positioning holes 111 respectively, the two upper positioning pieces 151' are respectively positioned to the front end and the rear end of the fixing portion 42, the two upper positioning pieces 151' can limit a position of the fixing portion 42 which is in the front-rear direction D1. Each partitioning plate 15 further has a fixing piece 155 which extends upwardly and is large in the up and narrow in the down, the fixing piece 155 is used to firstly pass through a penetrating hole 113 of the top wall 11, then pass through the fixing hole 423 of the corresponding fixing portion 42 of the clip 4 and then is twisted by an angle, so that the fixing portion 42 of the clip 4 is fixed (in the figures, a state that the fixing piece 155 is not twisted is shown).

Elastic acting forces provided by the plurality of pressing-against portions 43 can assure that when the pluggable module 200 inserts into the accommodating space 16, the thermal coupling portion 311 of the corresponding heat sink 3 can maintain contact with a top surface of the inserting portion 201a of the pluggable module 200 as completely as possible, so that the corresponding heat sink 3 can cooperatively dissipate heat.

Referring to FIG. 2 to FIG. 3 and FIG. 6 to FIG. 8, in the present embodiment, a location of the shielding cage 1 which corresponds to each accommodating space 16 is provided with the two light guiding pipes 5 and one base 6, the two light guiding pipes 5 are assembled to the shielding cage 1 and the base 6. Each light guiding pipe 5 has a first segment 54 which extends along the front-rear direction D1 and is assembled to above the top wall 11 of the shielding cage 1 and a second segment 55 which extends downwardly from a rear end of the first segment 54 and is assembled to the base 6. Each light guiding pipe 5 has a light outputting end 51 which is positioned at a front end of the light guiding pipe 5, a light inputting end 52 which is positioned at a rear end of the light guiding pipe 5, and a first assembling portion 53 which is provided at a location of the light guiding pipe 5 adjacent to the light inputting end 52 (at a lower end portion of the second segment 55). Each base 6 includes an assembling plate 61 which is assembled to the rear wall 14 of the shielding cage 1 and a seat body 62 which extends rearwardly from a lower portion of a rear side surface of the assembling plate 61, the seat body 62 has two light guiding pipe accommodating holes 621, two second assembling portions 622 which are respectively provided to the two light guiding pipe accommodating holes 621, and two light emitting member accommodating spaces 626 which are respectively communicated with bottom portions of the two light guiding pipe accommodating holes 621 and are used to accommodate light emitting members (not shown) on the circuit board. Here, the location of the light guiding pipe 5 adjacent to the light inputting end 52 (the lower end portion of the second segment 55) is assembled in the light guiding pipe accommodating hole 621 of the base 6, after the first assembling portion 53 of the light guiding pipe 5 is assembled to the second assembling portion 622 at the light guiding pipe accommodating hole 621 relative to the base 6 along a direction which is from the up to the down, the light guiding pipe 5 is rotated in a rotating direction R (see FIG. 6) which extends around the up-down direction D2 so that the first assembling portion 53 is fixed on the second assembling portion 622 at the light guiding pipe accommodating hole 621.

Figure 7:
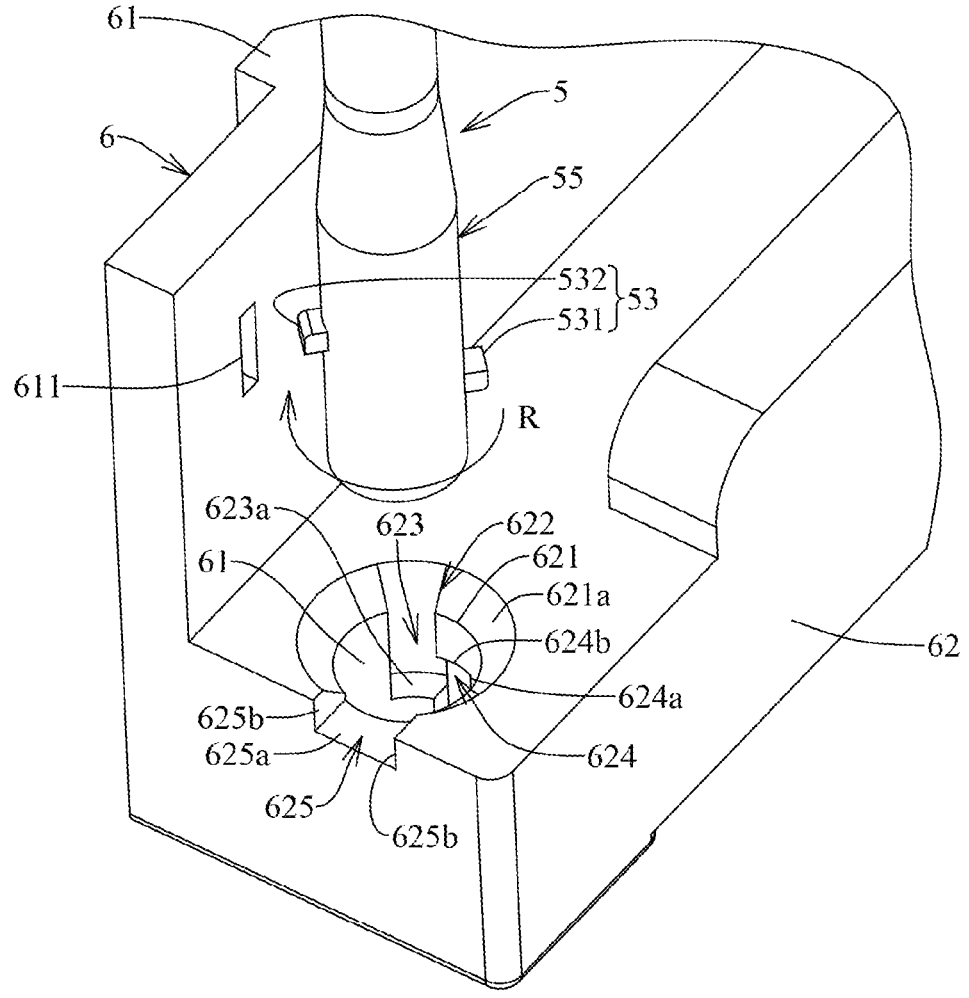
FIG. 7 is a perspective exploded view of the light guiding pipe and the base of the embodiment.
Figure 8:
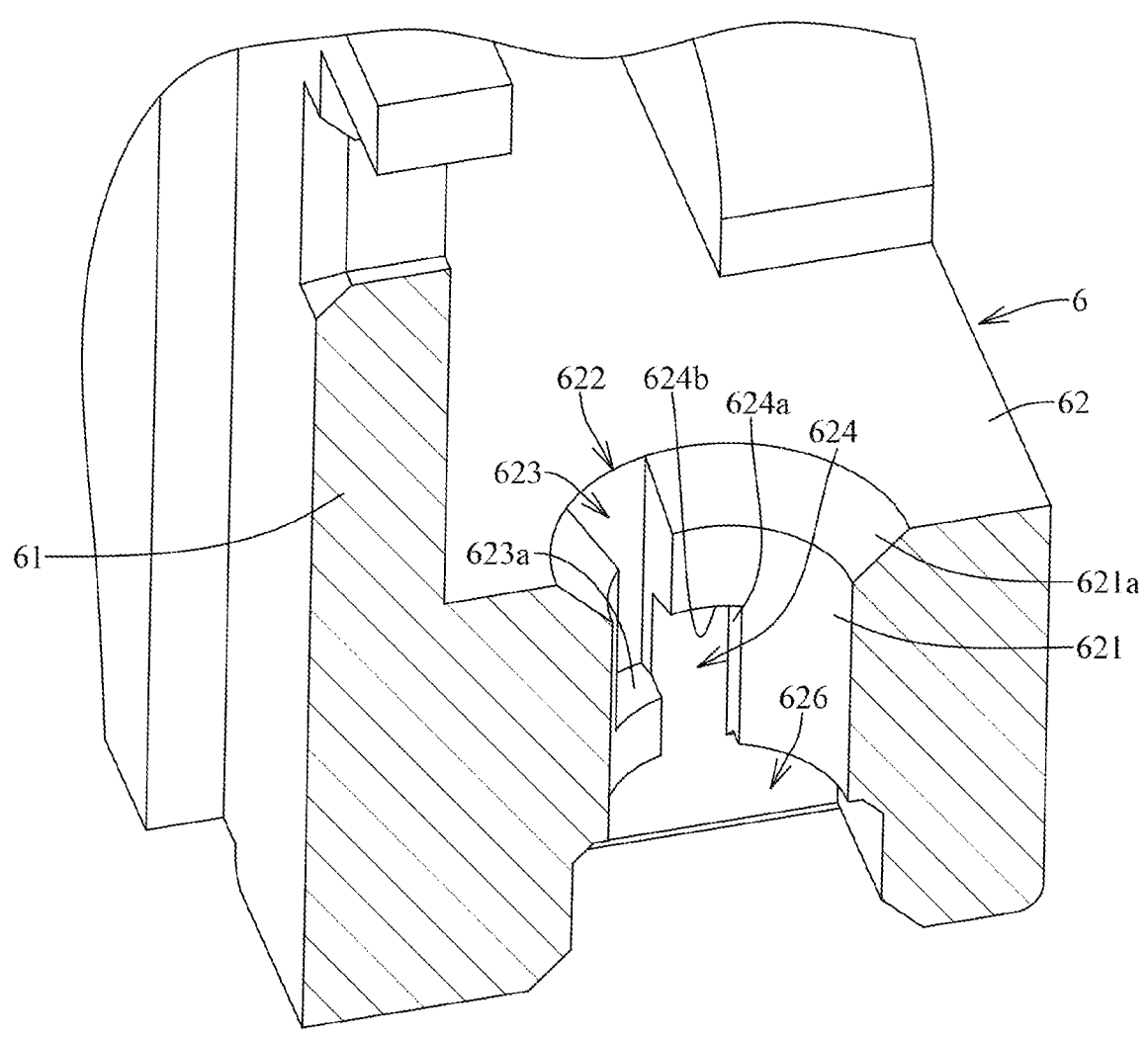
FIG. 8 is a partial cut perspective view of the base of the embodiment.
Figure 9:
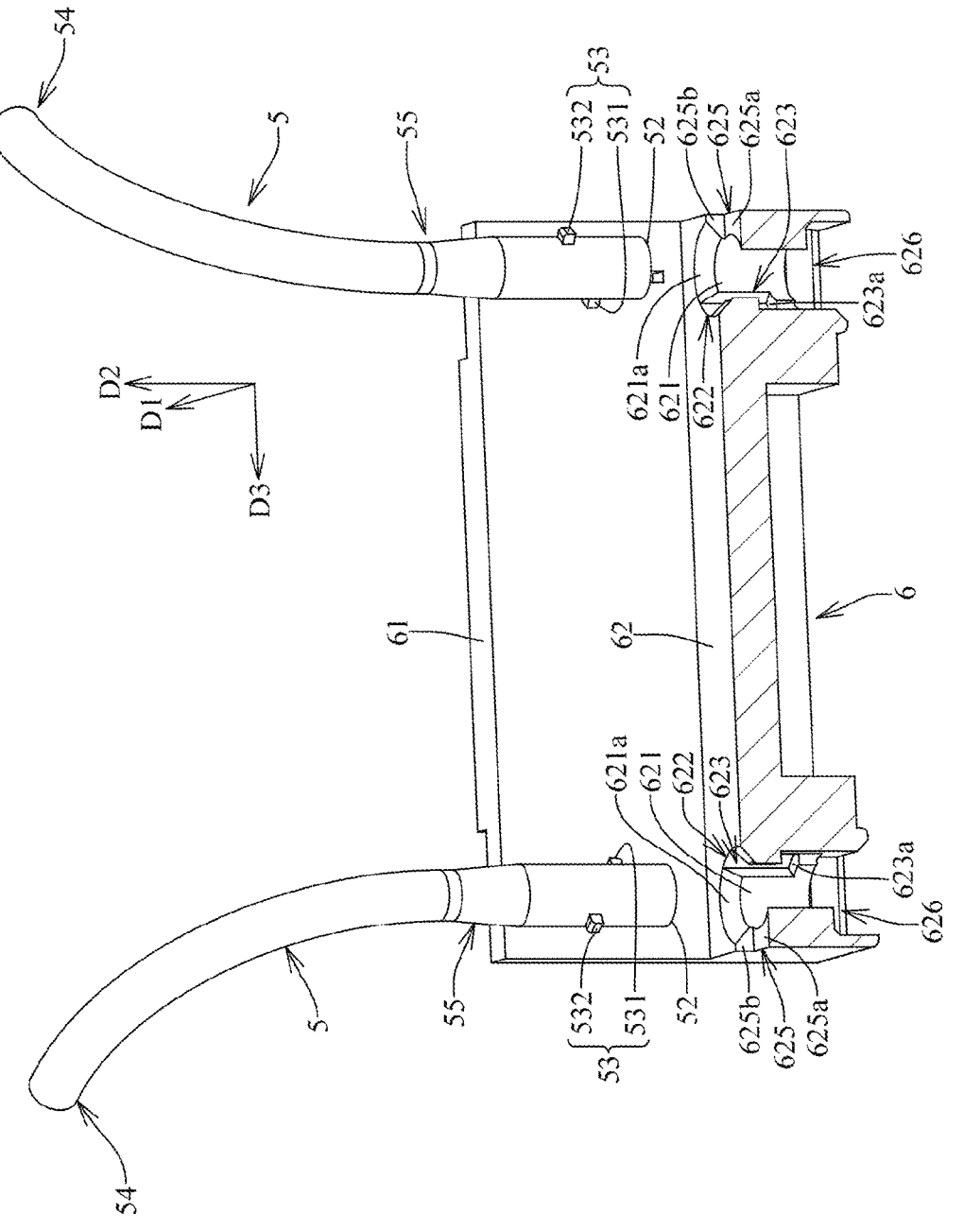
FIG. 9 is a perspective schematic view of the light guiding pipes and the base of the embodiment, in which the light guiding pipes are not assembled to the base.

As shown in FIG. 9, in the embodiment, the second assembling portions 622 at the two light guiding pipe accommodating holes 621 of the base 6 are a mirror symmetrical construction relative to the base 6, the first assembling portions 53 of the two light guiding pipes 5 are also a mirror symmetrical construction, so the first assembling portion 53 and the second assembling portion 622 as shown in the left of FIG. 9 are described below, the first assembling portion 53 and the second assembling portion 622 in the right is a construction which is mirror symmetric. Referring to FIG. 7 and FIG. 8, the first assembling portion 53 includes a locking block 531 and a position-limiting block 532 which protrude from a side surface of the light guiding pipe 5. The second assembling portion 622 at the light guiding pipe accommodating hole 621 includes a locking block insertion groove 623 and a locking block locking groove 624 which correspond to the locking block 531, and a position-limiting block accommodating recessed groove 625 which corresponds to the position-limiting block 532, in addition, the light guiding pipe accommodating hole 621 has a guiding inner edge 621a which is positioned at a top end of the light guiding pipe accommodating hole 621 and gradually expands upwardly. Specifically, the locking block 531 and the position-limiting block 532 are respectively positioned on a left side and a right side of the light guiding pipe 5 in opposite directions, and a position of the position-limiting block 532 is higher than a position of the locking block 531. The locking block insertion groove 623 extends downwardly from the top end of the light guiding pipe accommodating hole 621 along an inner wall surface of the light guiding pipe accommodating hole 621, the locking block insertion groove 623 has a lower end surface 623a which is used to limit a position of the locking block 531 in a downward direction, the locking block locking groove 624 is communicated with the locking block insertion groove 623 from a position where the lower end surface 623a is present and circumferentially extends along the inner wall surface of the light guiding pipe accommodating hole 621 along the rotating direction R, the locking block locking groove 624 has an inner stopping surface 624a which is used to limit a position of the locking block 531 after the locking block 531 is rotated, and the locking block locking groove 624 has a locking block upper stopping surface 624b which is used to limit a position of the locking block 531 in an upward direction. The position-limiting block accommodating recessed groove 625 includes a position-limiting block lower stopping surface 625a which is constructed by a bottom surface of the position-limiting block accommodating recessed groove 625 and is used to limit a position of the position-limiting block 532 in the downward direction and two position-limiting surfaces 625b which are constructed by two inner end surfaces of the position-limiting block accommodating recessed groove 625 and are used to limit a position of the position-limiting block 532 before the position-limiting block 532 is rotated and a position of the position-limiting block 532 after the position-limiting block 532 is rotated.

Figure 10:
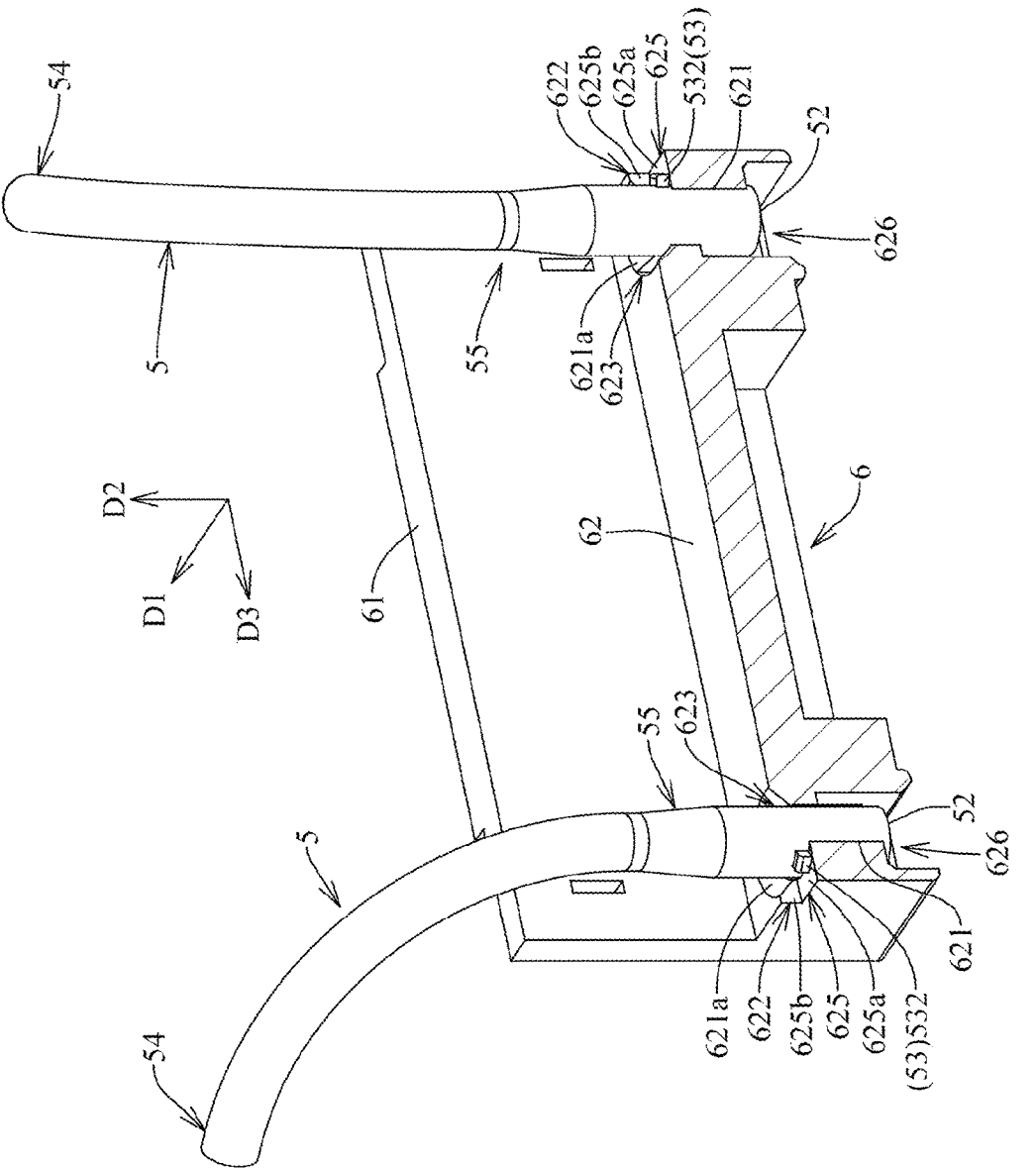
FIG. 10 is a perspective schematic view of the light guiding pipes and the base of the embodiment, in which a locking block of the light guiding pipe downwardly inserts into a locking block insertion groove of a light guiding pipe accommodating hole of the base, a position-limiting block of the light guiding pipe is accommodated in a position-limiting block accommodating recessed groove of the base.

Referring to FIG. 9 and FIG. 10, when the locking block 531 of the light guiding pipe 5 inserts into the locking block insertion groove 623 at the light guiding pipe accommodating hole 621 from up to down, the position-limiting block 532 is accommodated in the position-limiting block accommodating recessed groove 625 at the same time, and the locking block 531 is capable of being subjected to be limited by the lower end surface 623a of the locking block insertion groove 623 in the downward direction, the position-limiting block 532 is capable of being limited by the position-limiting block lower stopping surface 625a of the position-limiting block accommodating recessed groove 625, at least by the one pair of the above two pairs of cooperating constructions, a position and a depth of the light guiding pipe 5 which inserts into the light guiding pipe accommodating hole 621 are limited. In a state as shown in FIG. 9 and FIG. 10, the first segment 54 of the light guiding pipe 5 is inclined by an angle relative to the front-rear direction D1, for example, the angle may be 30 degrees, but an amount of the angle may be varied as desired, and should not be limited thereto, and moreover, because assembling of the two light guiding pipes 5 and the two light guiding pipe accommodating holes 621 constructs a mirror symmetrical relationship, an angle of the first segment 54 of the other light guiding pipe 5 relative to the front-rear direction D1 is positioned in an opposite direction.

Figure 11:
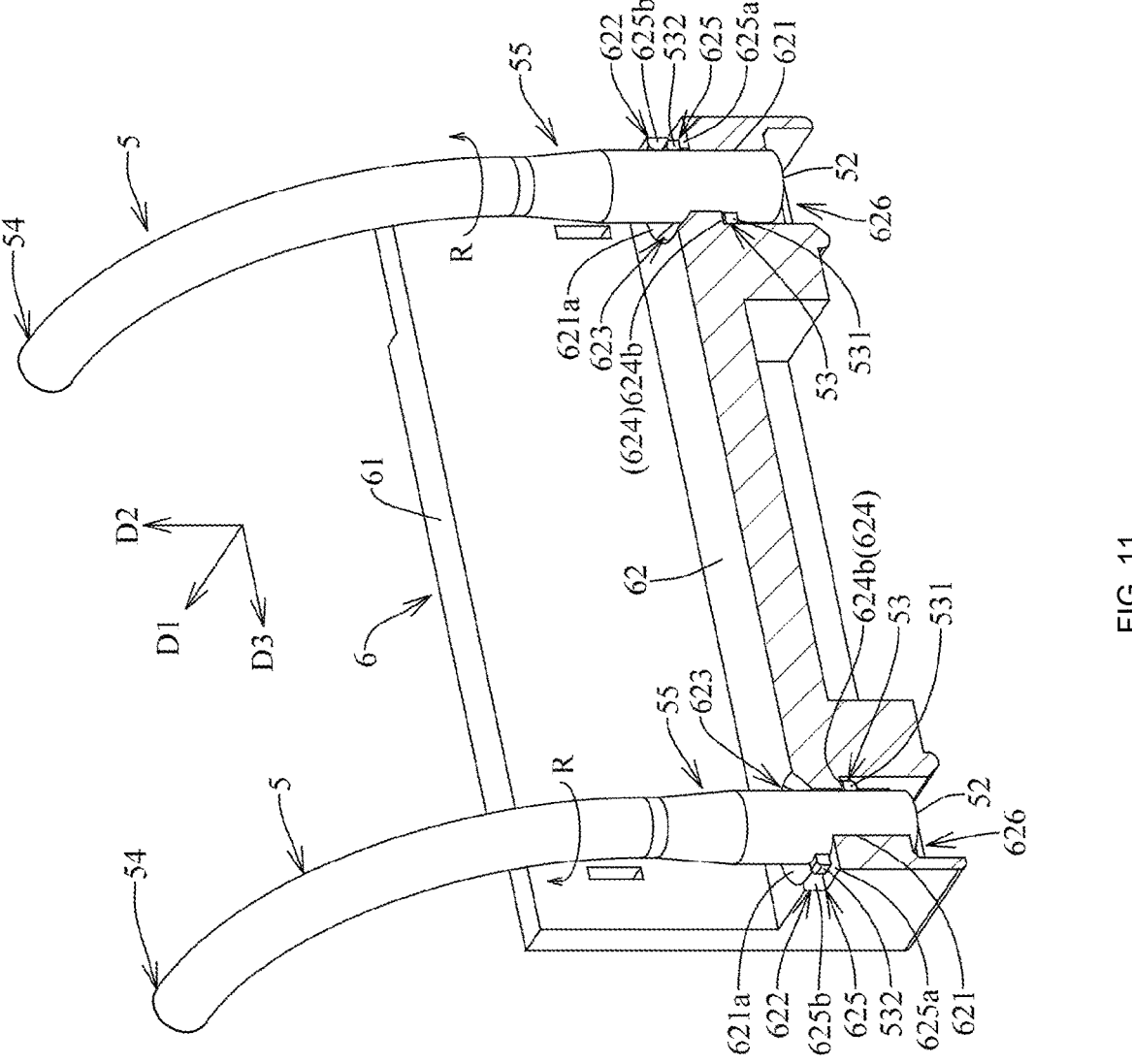
FIG. 11 is a perspective schematic view of the light guiding pipes and the base of the embodiment, in which the locking block of the light guiding pipe enters into the locking block locking groove of the base, and the light guiding pipe has been assembled to the base.
Figure 12:
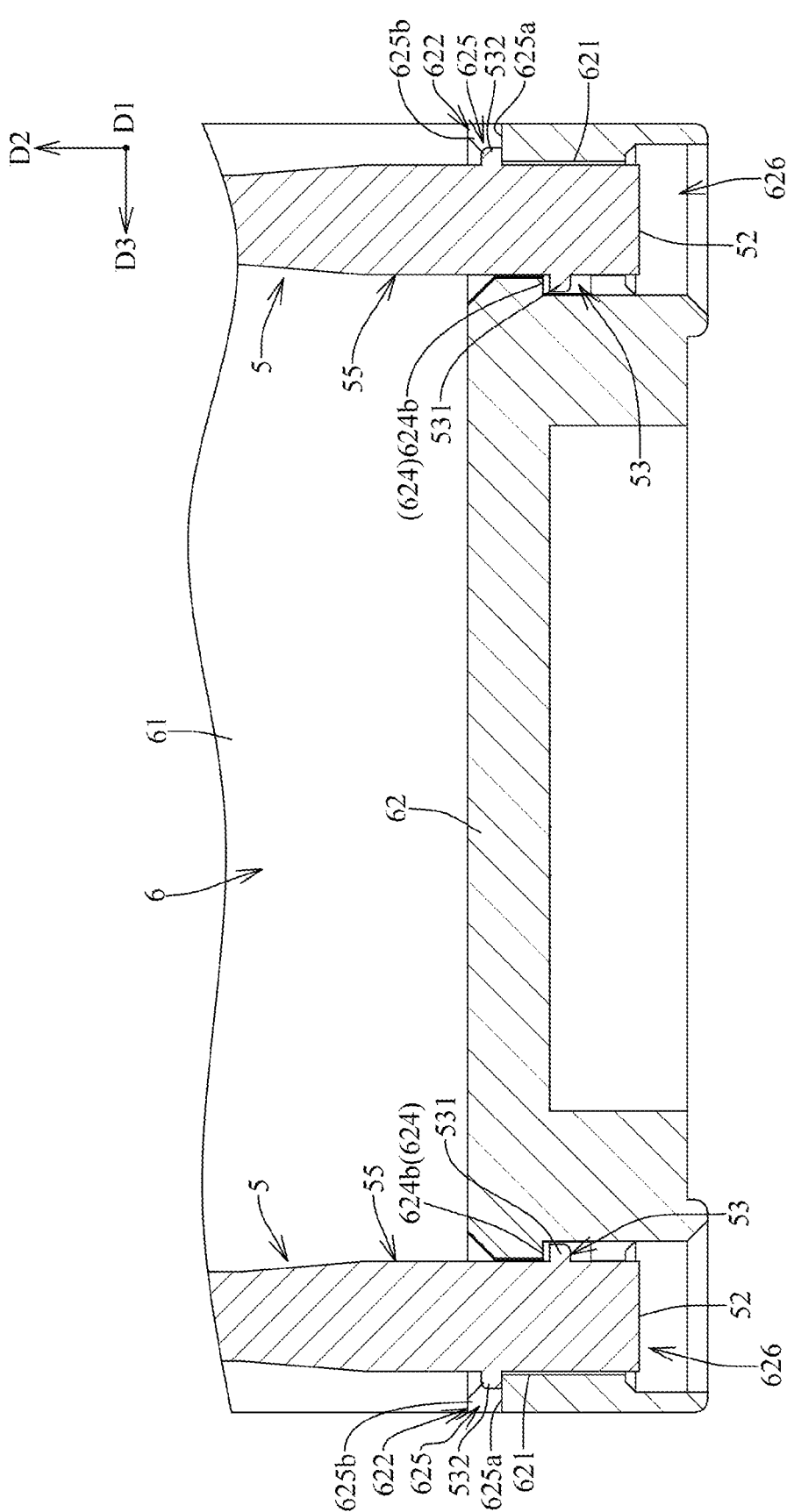
FIG. 12 is a partial cross sectional view of the light guiding pipes and the base of the embodiment, in which a state of the light guiding pipe and the base is the same as that of FIG. 11.
Figure 13:
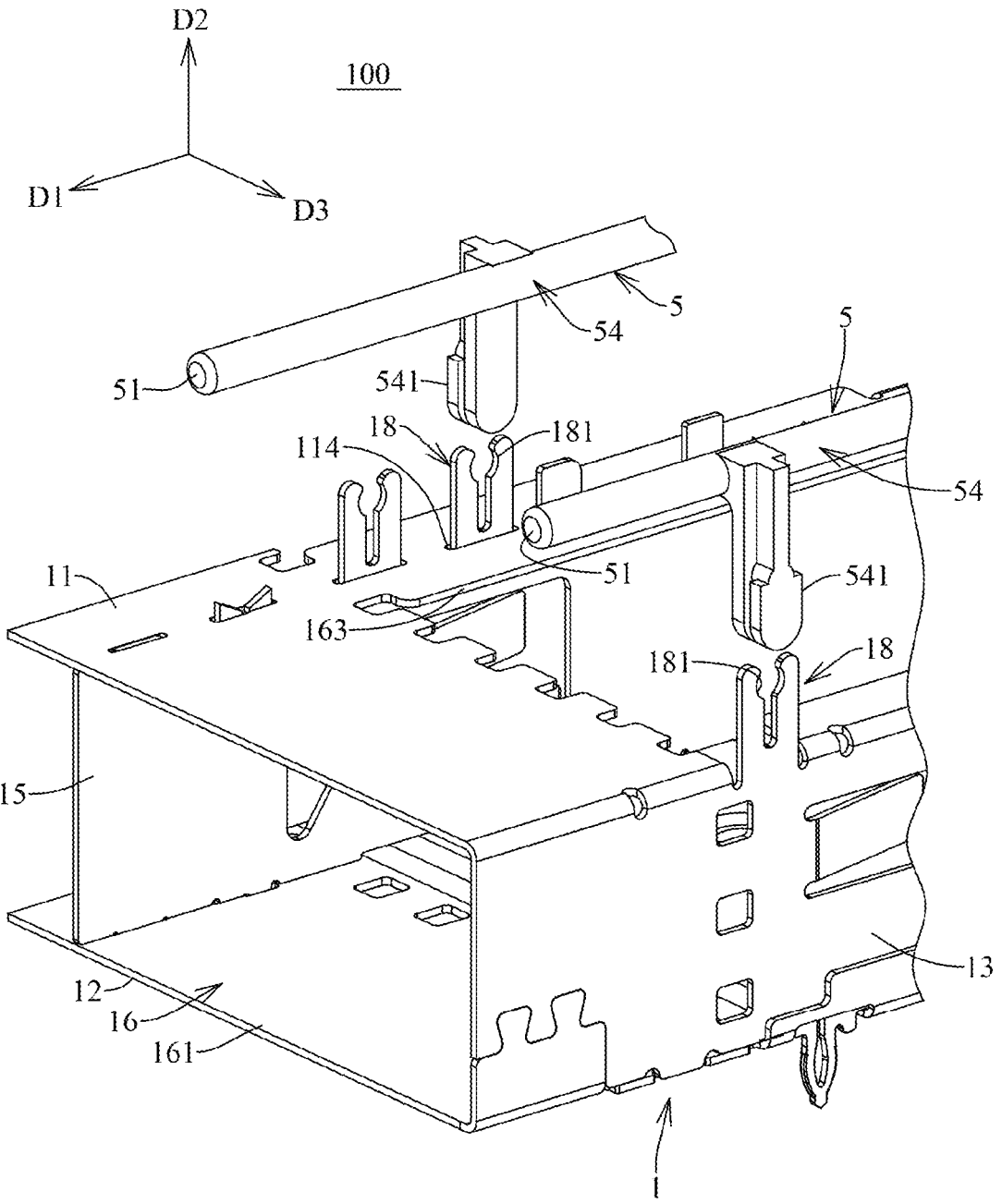
FIG. 13 is a partial perspective exploded view of the embodiment, which illustrates a state that the light guiding pipes and the shielding cage are separated from each other.
Figure 14:
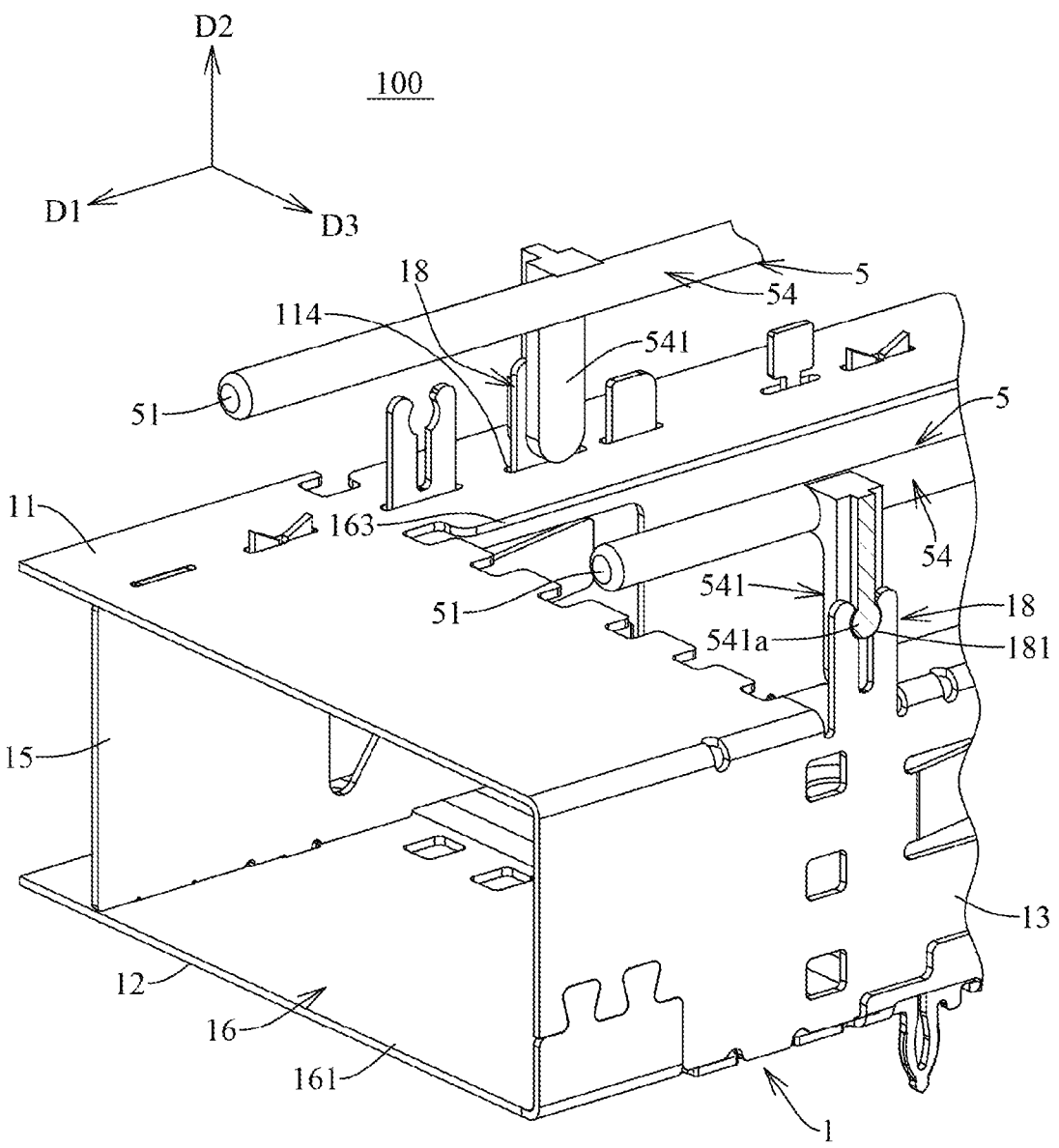
FIG. 14 is a partial perspective view of the embodiment, which illustrates a state that the light guiding pipes have been assembled to the shielding cage, in which a part of the positioning block of one of the light guiding pipes is cut away.
Figure 15:
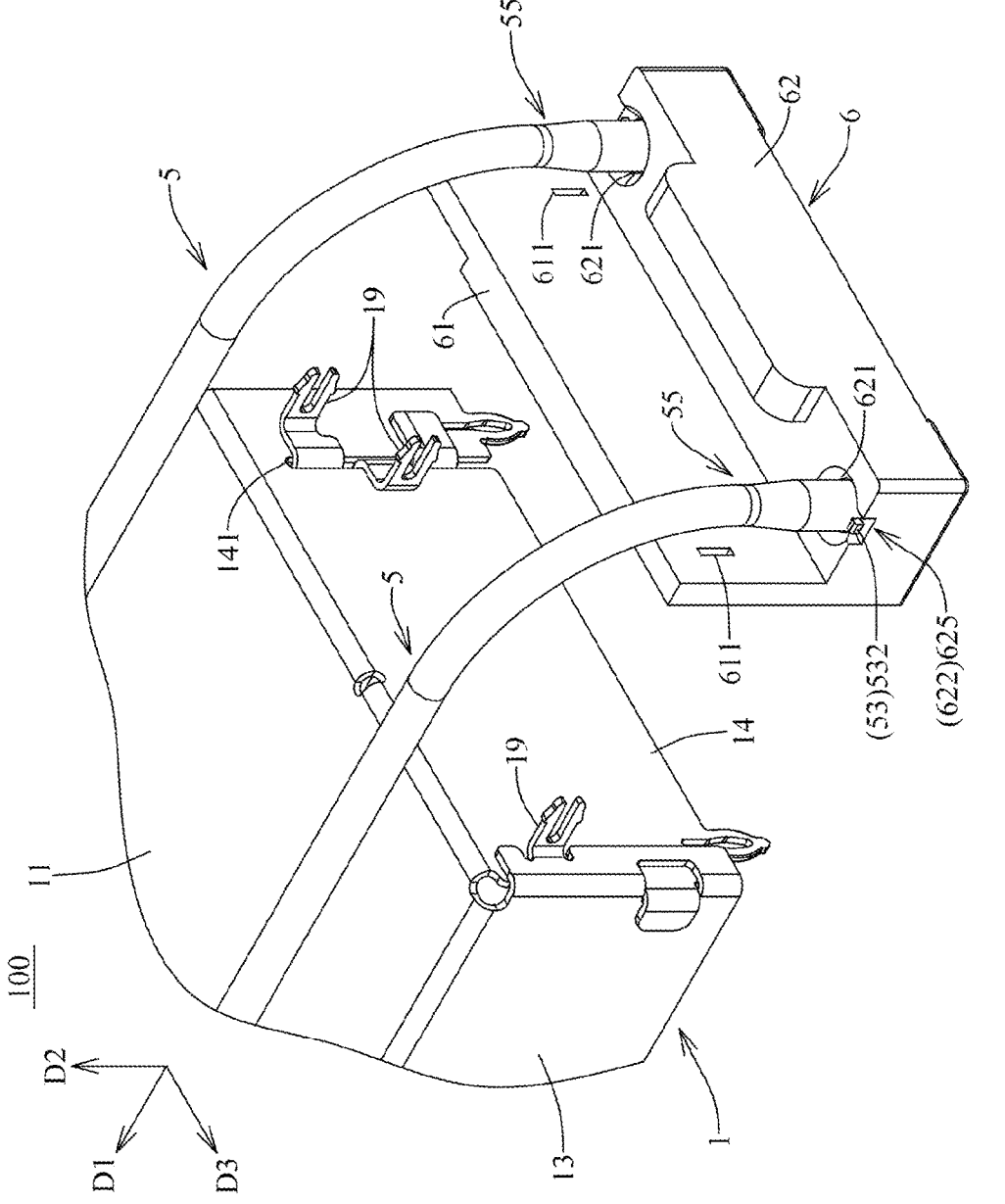
FIG. 15 is a partial perspective exploded view of the light guiding pipes, the base and the shielding cage of the embodiment.

Referring to FIG. 11 to FIG. 12, taking the second segment 55 of the light guiding pipe 5 as an axis, employing the rotating direction R as shown in FIG. 11 (for example a clockwise direction under the view angle of FIG. 11), the light guiding pipe 5 is rotated so that the locking block 531 rotates to enter into the locking block locking groove 624 (the rotating direction R of the other light guiding pipe 5 is reversed), the first segment 54 of the light guiding pipe 5 is together rotated to be parallel to the front-rear direction D1, and, the locking block 531 is subjected to be limited by the locking block upper stopping surface 624b of the locking block locking groove 624 in the upward direction and is subjected to be limited by the inner stopping surface 624a of the locking block locking groove 624 in the rotating direction R, the position-limiting block 532 is subjected to be limited by the position-limiting block lower stopping surface 625a of the position-limiting block accommodating recessed groove 625 in the downward direction. Therefore, after the light guiding pipe 5 is rotated to be parallel to the front-rear direction D1, the light guiding pipe 5 is subjected to be limited in the upward direction and the downward direction respectively by the locking block upper stopping surface 624b and the position-limiting block lower stopping surface 625a so that the light guiding pipe 5 is fixed in the light guiding pipe accommodating hole 621, and after the light guiding pipe 5 is rotated to be parallel to the front-rear direction D1, because the light guiding pipe 5 is subjected to be limited by the inner stopping surface 624a of the locking block locking groove 624, the light guiding pipe 5 can not be continuously rotated. In addition, before the light guiding pipe 5 is rotated and after the light guiding pipe is rotated, positions of the position-limiting block 532 are respectively limited by the two position-limiting surfaces 625b of the position-limiting block accommodating recessed groove 625.

Referring to FIG. 2 to FIG. 3 and FIG. 13 to FIG. 15, after the two light guiding pipes 5 are assembled to the base 6, the first segments 54 of the two light guiding pipes 5 are capable of aligning with the front-rear direction D1, being arranged in the left-right direction D3 and being assembled onto the shielding cage 1. The shielding cage 1 has a plurality of positioning pieces 18 which are formed at front segments of the two side walls 13 and front segments of the partitioning plates 15 and upwardly extend out of the top wall 11 and a plurality of holding pieces 19 which are formed to rear ends of the two side walls 13 and rear ends of the partitioning plates 15 and rearwardly extend out of the rear wall 14. The positioning pieces 18 which are formed to the plurality of partitioning plates 15 pass through the penetrating hole 114 of the top wall 11 and extend upwardly, the holding pieces 19 which are formed to the plurality of partitioning plates 15 pass through the penetrating holes 141 of the rear wall 14 and extend rearwardly.

The first segment 54 of the light guiding pipe 5 is assembled to above the top wall 11 of the shielding cage 1, the first segment 54 of the light guiding pipe 5 has a positioning block 541 which extends downwardly and is correspondingly and cooperatively assembled to the positioning piece 18, the positioning piece 18 has a positioning recessed groove 181 which is opened upwardly, the positioning block 541 of the light guiding pipe 5 has a positioning neck 541a which is correspondingly and cooperatively assembled into the positioning recessed groove 181 from up to down. The assembling plate 61 of the base 6 has two holding holes 611 which allow the holding pieces 19 to cooperatively and correspondingly insert therein with interference, so that the base 6 is fixed on the rear wall 14 of the shielding cage 1. Specifically, in a process of assembling, it may be that, the base 6 is firstly assembled to the rear wall 14 of the shielding cage 1, and then the positioning block 541 of the light guiding pipe 5 is assembled to the positioning piece 18 of the shielding cage 1, by that the positioning block 541 of the light guiding pipe 5 is assembled to the positioning piece 18, it can further prevent the light guiding pipe 5 from rotating and make the first segment 54 of the light guiding pipe 5 parallel to the front-rear direction D1, so as to further completely position a position of the light guiding pipe 5.

In conclusion, in the connector assembly 100 of the present disclosure, a rotary type assembling structure between the light guiding pipe 5 and the base 6 is employed, not only the light guiding pipe 5 and the base 6 have a reliable engagement force after the light guiding pipe 5 and the base 6 are assembled, but also the light guiding pipe 5 and the base 6 are not easily subjected to be damaged after the light guiding pipe 5 and the base 6 are repeatedly disassembled and assembled.

However, what is described above is just the embodiment of the present disclosure, which is not intended to limit the scope implementing the present disclosure, any simple equivalent variations and modifications made according to the claims and the specification of the present disclosure will also be fallen within the scope of the present disclosure.

What is claimed is:

1. A connector assembly, comprising:
a shielding cage having a plurality of walls and an accommodating space defined by the plurality of walls;
a light guiding pipe assembled to the shielding cage, the light guiding pipe having a light outputting end, a light inputting end and a first assembling portion at a location of the light guiding pipe adjacent to the light inputting end, the first assembling portion comprising a locking block which protrudes from a side surface of the light guiding pipe; and
a base having a light guiding pipe accommodating hole and a second assembling portion provided to the light guiding pipe accommodating hole, wherein
the light guiding pipe is assembled in the light guiding pipe accommodating hole,
the first assembling portion of the light guiding pipe being is assembled to the second assembling portion of the light guiding pipe accommodating hole, and
after the first assembling portion of the light guiding pipe is assembled to the second assembling portion of the light guiding pipe accommodating hole from up to down relative to the base, the light guiding pipe is rotated along a rotating direction so that the first assembling portion is fixed to the second assembling portion at the light guiding pipe accommodating hole by the locking block.

2. The connector assembly of claim 1, wherein
the second assembling portion comprises a locking block insertion groove and a locking block locking groove,
the locking block insertion groove extends downwardly from a top end of the light guiding pipe accommodating hole along an inner wall surface of the light guiding pipe accommodating hole,
the locking block locking groove is communicated with the locking block insertion groove and extends circumferentially along the inner wall surface of the light guiding pipe accommodating hole along the rotating direction, and
after the locking block of the light guiding pipe inserts into the locking block insertion groove at the light guiding pipe accommodating hole from up to down, the light guiding pipe is capable of being fixed by rotating the light guiding pipe to make the locking block rotate and enter into the locking block locking groove.

3. The connector assembly of claim 2, wherein
the locking block insertion groove has a lower end surface which is used to limit a position of the locking block in a downward direction, and
the locking block locking groove has an inner stopping surface which is used to limit a position of the locking block after the locking block is rotated.

4. The connector assembly of claim 2, wherein
the first assembling portion further comprises a position-limiting block which protrudes from the side surface of the light guiding pipe, the second assembling portion further comprises a position-limiting block lower stopping surface which is used to limit a position of the position-limiting block in a downward direction, and
the locking block locking groove has a locking block upper stopping surface which is used to limit a position of the locking block in an upward direction.

5. The connector assembly of claim 4, wherein
the second assembling portion further comprises a position-limiting block accommodating recessed groove, and
the position-limiting block accommodating recessed groove comprises the position-limiting block lower stopping surface which is constructed by a bottom surface of the position-limiting block accommodating recessed groove and two position-limiting surfaces which are constructed by two inner end surfaces of the position-limiting block accommodating recessed groove and are respectively used to limit a position of the position-limiting block before the position-limiting block is rotated and a position of the position-limiting block after the position-limiting block is rotated.

6. The connector assembly of claim 5, wherein
the locking block and the position-limiting block are respectively positioned to two opposite sides of the light guiding pipe, and a position of the position-limiting block is higher than a position of the locking block.

7. The connector assembly of claim 1, wherein
the light guiding pipe accommodating hole has a guiding inner edge which is positioned a top end of the light guiding pipe accommodating hole and gradually expands upwardly.

8. The connector assembly of claim 1, wherein
the base further has a light emitting member accommodating space which is communicated with a bottom portion of the light guiding pipe accommodating hole.

9. The connector assembly of claim 1, wherein
the plurality of walls of the shielding cage comprise a top wall and a rear wall,
the light guiding pipe has a first segment which extends along a front-rear direction and is assembled to the top wall of the shielding cage and a second segment which extends downwardly from a rear end of the first segment and is assembled to the base, and
the base is fixed on the rear wall of the shielding cage.

10. The connector assembly of claim 9, wherein
when the locking block of the light guiding pipe inserts into to a locking block insertion groove at the light guiding pipe accommodating hole, the light guiding pipe is inclined laterally relative to the front-rear direction by an angle, and
after rotating the light guiding pipe makes the locking block rotate and enter into the locking block locking groove, the light guiding pipe is rotated to be parallel to the front-rear direction.

11. The connector assembly of claim 10, wherein
the shielding cage has a holding piece which is adjacent to the rear wall, and
the base has a holding hole which allows the holding piece to correspondingly insert therein.

12. The connector assembly of claim 9, wherein
the shielding cage has a positioning piece which is adjacent to the top wall, and
the first segment of the light guiding pipe has a positioning block which correspondingly cooperates with the positioning piece.

13. The connector assembly of claim 12, wherein the positioning piece has a positioning recessed groove, and the positioning block of the light guiding pipe has a positioning neck which correspondingly cooperates with the positioning recessed groove.

14. An assembly, comprising:

a shielding cage;

a light guiding pipe assembled to the shielding cage, the light guiding pipe having a light outputting end, a light inputting end, and a first assembling portion with a locking block; and a base having a light guiding pipe accommodating hole, wherein the first assembling portion of the light guiding pipe is assembled to the light guiding pipe accommodating hole by the locking block.

15. The assembly of claim 14, wherein the base further comprises a locking block insertion groove and a locking block locking groove, the locking block locking groove extends circumferentially along an inner wall surface of the light guiding pipe accommodating hole, and the light guiding pipe is capable of being fixed by rotating the light guiding pipe to make the locking block rotate and enter into the locking block locking groove.

16. The assembly of claim 15, wherein the locking block insertion groove has a lower end surface which is used to limit a position of the locking block in a downward direction, and the locking block locking groove has an inner stopping surface which is used to limit a position of the locking block after the locking block is rotated.

17. The assembly of claim 14, wherein the first assembling portion of the light guiding pipe further comprises a position-limiting block, and the base further comprises a stopping surface used to limit a position of the position-limiting block in a downward direction.

18. An assembly, comprising:

a shielding cage;

a light guiding pipe assembled to the shielding cage, the light guiding pipe having a light outputting end, a light inputting end, and a first assembling portion with a position-limiting block; and a base having a light guiding pipe accommodating hole and a stopping surface, wherein the first assembling portion of the light guiding pipe is assembled to the light guiding pipe accommodating hole with the stopping surface used to limit a position of the position-limiting block in a downward direction.

19. The assembly of claim 18, wherein the first assembling portion of the light guiding pipe comprises a locking block, and the light guiding pipe is assembled to the light guiding pipe accommodating hole by the locking block.

20. The assembly of claim 18, wherein the first assembling portion of the light guiding pipe comprises a locking block, the base further comprises a locking block locking groove, the light guiding pipe is capable of being fixed by rotating the light guiding pipe to make the locking block rotate and enter into the locking block locking groove.

* * * * *